Figure 1:
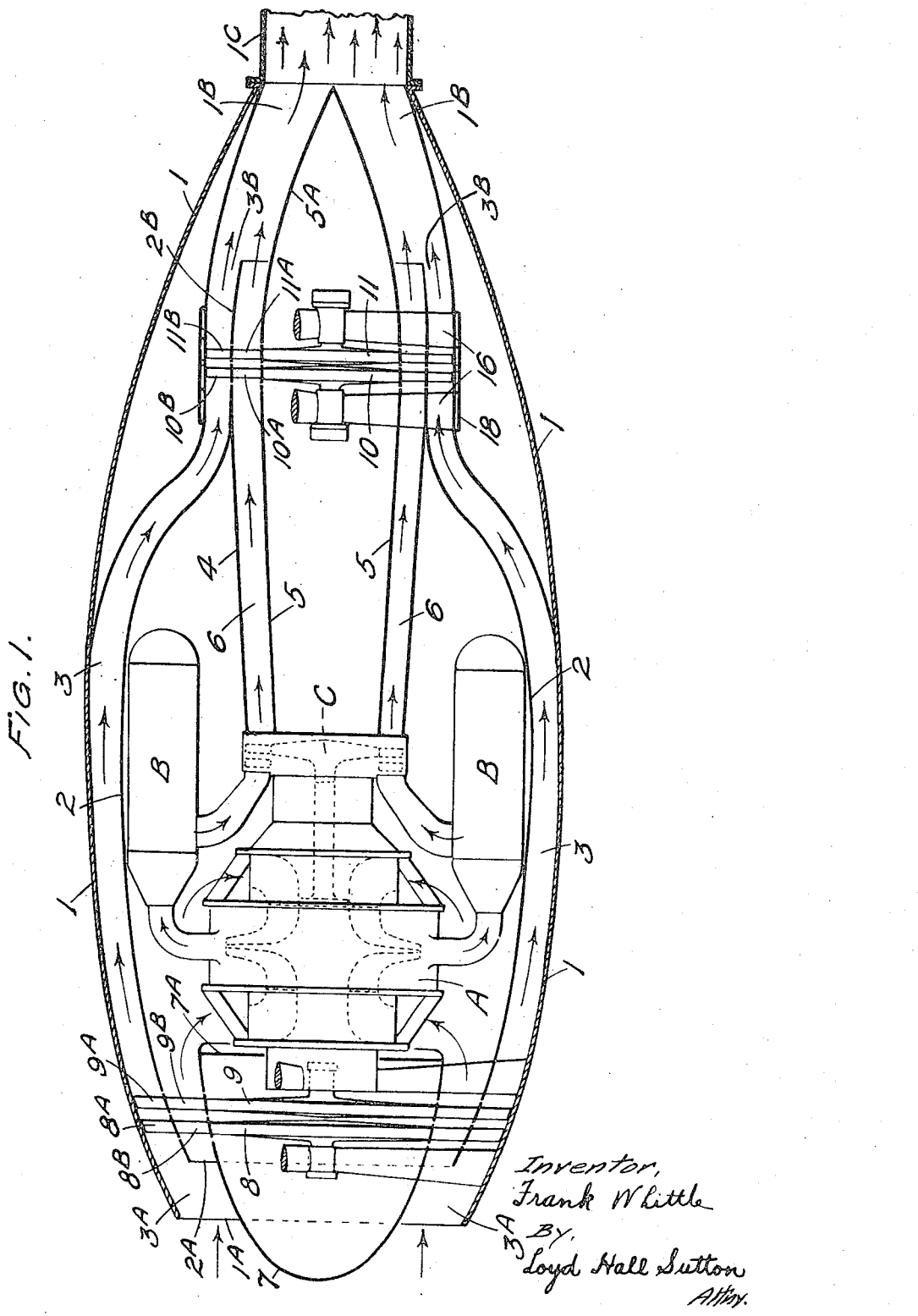

Aug. 13, 1946. F. WHITTLE 2,405,919
FLUID FLOW ENERGY TRANSFORMER
Filed Oct. 23, 1942 2 Sheets-Sheet 2

Inventor,
Frank Whittle
By
Loyd Hall Sutton
Atty.

Patented Aug. 13, 1946

2,405,919

UNITED STATES PATENT OFFICE 2,405,919

FLUID FLOW ENERGY TRANSFORMER

Frank Whittle, Rugby, England, assignor to Power Jets (Research and Development) Limited, London, England Application October 23, 1942, Serial No. 463,140
In Great Britain March 2, 1940

8 Claims. (Cl. 60—35.6)

This invention relates to fluid flow energy transformers and the application thereof to propulsive systems, more especially (but not necessarily exclusively) of aircraft. By the term fluid flow energy transformer is meant, means or a system by which a flow of fluid at one energy potential is made to affect a second flow so as to vary the energy potential in the second. Thus for example, the relative airflow through a power nacelle of an aircraft may be robbed of energy which is transformed into pressure energy in an engine induction system to boost the engine; and by further transformation the energy-depleted airflow through the nacelle may be reenergised, this energy being derived from that in an exhaust flow from the engine. In addition this second transformation may impart energy to the airflow beyond that which was originally available, in order effectively to use this airflow as, or as part of, a reaction propulsion jet. Whilst such example is clearly primarily applicable to aircraft, it is conceivable that it might be employed for the propulsion of other vehicles or objects.

Whilst the present proposals have in mind particularly, propulsion systems which are dependent on jet reaction only, it will be appreciated that they may be included in systems using airscrew propulsion, although it is believed that some degree of propulsion by jet reaction will always be utilised to take full advantage of the invention.

According to the invention, there is proposed a propulsion system in which the prime mover is a combustion engine, and which includes energy transforming means comprising turbine means driven by an air stream and impeller means to operate in a second air stream and driven by the said turbine means, the air from the impeller means being supplied to the combustion engine, and the exhaust from the combustion engine operates second energy transforming means again comprising turbine and impeller means which impart energy into the first airstream to raise its energy potential.

Further according to the invention, the turbine and impeller means comprise paired or twin wheels arranged to spin in opposite rotational sense coaxially, the blading and impeller blading being carried by each wheel, preferably one row outside the other. By virtue of such arrangement the leaving streams from the turbine and the impeller means, can be substantially purely axial in direction, which is desirable. Or, other blade means may be provided to ensure substantial axiality of flow. (In referring to a flow as axial it is intended to distinguish only from rotational, and not to exclude a radial component of direction). The exhaust of the engine and the reenergised airflow from the second impeller means, may be caused to join into one common stream for the purpose of reaction propulsion, and the pressures and velocities where they join may by design be adjusted to be practically equal.

The invention embraces an arrangement of a nacelle and other components which is preferred; this arrangement provides an annular air duct confining the airflow through the nacelle in which the first turbine and second impeller means are operatively exposed; and a pressure compartment containing the combustion engine, with an annular intake eye, and an annular exhaust duct.

In the air intake for engine supply operates the first impeller means, and in the exhaust duct the second turbine means. The annular form of the ducts is thus well adapted not only to the nacelle form in which it is proposed to embody the invention, but also to the particular form of wheels proposed. The fluid flows are preferably confined, that is to say, they flow within confines formed by walls or the like.

The invention is intended to be used with a combustion engine for reaction propulsion of the previously proposed kind in which is combined a compressor for air, fuel burning means in the compressed air delivered therefrom, and a gas turbine driven by the resultant gases and using part of the useful energy thereof to drive the compressor, the gaseous output leaving the turbine forming the reaction propulsion jet stream. The invention is not, however, limited in its application, to this particular kind of combustion engine, which in any case forms no part of the present invention.

The main object of the present invention is to increase the effective thrust of a propulsive system which includes a combustion engine of which the performance can be raised by boosting the air intake. Another object is to increase the effective total momentum of fluid discharged in unit time, in a reaction jet propulsion system or a system for propulsion in part by reaction of a jet or jets. Other objects, such as the provision of a convenient and sound arrangement for a power nacelle, may be achieved by the invention.

Figure 2:
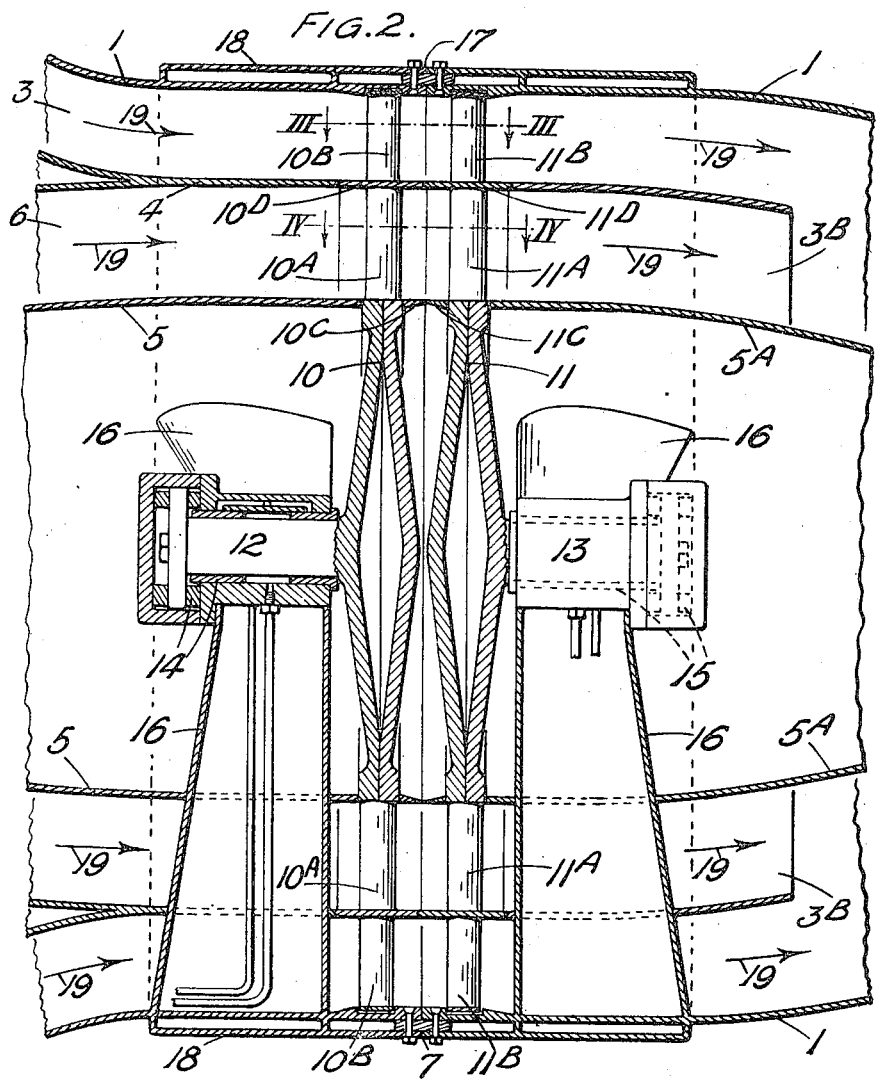
Figure 3:
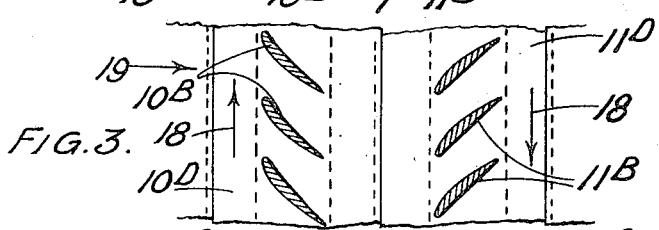
Figure 4:
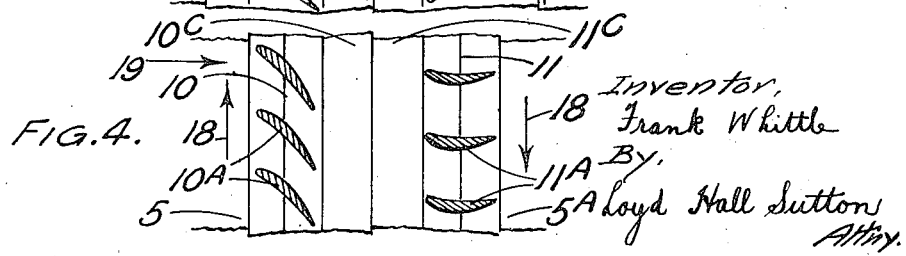

The invention and its objects will be better understood after considering the following description of an example of it, with the aid of the accompanying diagrammatic drawings. In these drawings, Figure 1 is a schematic view of an arrangement. Figure 2 is a sectional view of a scheme of twin wheel construction, and Figures 3 and 4 show representative blade sections of blades in Figure 2, on the lines III—III and IV—IV of Fig. 2 respectively.

In Figure 1, which illustrates a power nacelle for aircraft propulsion, the prime mover is a combustion engine illustrated as being in the same general form as that in Figure 1, namely: one comprising a compressor A, combustion chambers B, and axial flow gas turbine C. This engine is housed in a nacelle 1, having an open forward end for air intake, at 1A. The engine ABC is situated within an inner shell 2 which is, in effect, a pressure compartment, the engine being supplied with air from the atmosphere within it. The shell 2 has an air entry at 2A. Between the wall formed by the structure of the nacelle 1, and the shell 2, is an annular air duct 3, which extends from an open end 3A, within the opening at 1A, to an outlet 3B. The rear part 2B of the wall 2 forms in effect a continuation of an exhaust pipe 4 which confines the output gases from the turbine C. The passage in the pipe 4 is annular, being coaxial around an inner body 5 which at its rear end is tapered in streamline manner, as shown at 5A. The duct for the gases is at 6, and at the rear but within the rearwardly extending end of the nacelle 1 the gases from the duct 6 join the air from the outlet 3B, both streams emerging to atmosphere as a propulsion jet, through the nozzle formed at 1B by the rear end of the nacelle 1, or through a jet pipe built on to the rear end of the nacelle, indicated in broken line at 1C.

Within the forward end of the system is a paired wheel arrangement, ahead of which is a nose fairing 7 and behind which is an inner wall 7A which may enclose or protect auxiliary details of the engine ABC. This wheel arrangement comprises a first wheel 8 and second wheel 9. The wheels have two rows of blades each. They run in opposite directions. Their outer blades, 8A and 9A, act as turbine blades and their inner blades 8B, 9B, as impeller blades. The outer blades operate in and are driven by the airflow in the duct 3, de-energising this airflow, and the inner blades, which are rotated by the outer blades together with the respective wheels, receive air entering at 2A and raise the pressure in the engine compartment, thereby boosting the engine ABC. The air in the intake 1A is subject to Pitot pressure due to the relative velocity of the aircraft.

At the rear of the system a second pair of twin wheels is provided. These are 10, 11, carrying inner blades 10A, 11A, and outer blades 10B, 11B. The inner blades 10A, 11A, are turbine blades driven by the gas stream in the duct 6, and the outer blades 10B, 11B, are impeller blades imparting energy to the air in the duct 3.

The operation of the system will probably have been appreciated from the foregoing description, but can be summed up as follows. The flow of air entering the duct 3 through 3A imparts energy through the blades 8A, 9A, to the blades 8B, 9B, and so to the air entering the engine compartment through 2A. This raises the pressure at the air intakes of the compressor A, boosting the engine. The gas in duct 6 imparts energy through the blades 10A, 11A, to the blades 10B, 11B, and so to the air in the rear of the air duct 3, which air, accelerated, joins the gas and with it forms a propulsive jet emerging at 1B. The design is preferably such that the air stream through 3B is at equal velocity and pressure with the gas leaving the gas duct. But it is also possible, though probably less advantageous, merely to restore to the air the energy given up in the forward turbine pair (8A, 9A) so as to obviate what would otherwise be virtually a drag loss.

The pairs of wheels 8, 9, and 10, 11, are intended to be borne on journal and thrust bearings in structure which is rigid in itself so that gyroscopic forces from the wheels will be resisted within the structure and will not affect the aircraft. The blade shapes, pitch, and curvatures are entirely dependent on the duties required of them in design conditions. For example the pressure in the air duct 3 between the pairs of wheels may be arranged to be that of the atmosphere, or greater or less, the velocity varying accordingly. Again by suitably designing the ducts in regard to their cross-sectional area the pressures and velocities may be selected as may be found requisite. The inner structure within the nacelle is clearly open to wide variation, though it may be said that, in general, radial struts suitably streamlined will be provided to support inner members and components. Such struts may form structural parts of a wing into which the nacelle is wholly or partially built.

It is possible that the skin of the nacelle 1 may be omitted. The airflow in which the blades 8A, 9A, and 10A, 11A, operate, may then be the relative airflow over the outside of a nacelle formed by the compartment 2. In such a case the boundary layer air and adjacent air flowing over the outside of the nacelle will have its velocity reduced, (so that drag losses will be reduced) and this air will be re-accelerated after passing over the nacelle.

Referring now to Figures 2, 3 and 4, there is here illustrated schematically an arrangement proposed for the twin wheels 10, 11, of Figure 1. The forward twin wheels 8, 9, are intended to be arranged somewhat similarly so are not separately described. In Figure 2, it will be seen that the wheels 10, 11, are built of two dished disc-like parts, this being favoured to afford some measure of damping against vibration. They are carried on spindles 12, 13, which run in journal and thrust bearings 14, 15, lubricated by suitable piping, and supported on brackets each formed by three radial streamlined struts 16, which support the front and rear portions of the body 5, 5A and extend, through the wall of the pipe 4, to the outer structure of the nacelle 1. Here the brackets are anchored, by any suitable means preferably including a joint at 17, and such stiffening as may be required, indicated by the doubling of the skin at 18.

The wheel 10 has its turbine blades 10A and impeller blades 10B running exposed in the ducts 6 and 3, and the wheel 11, its blades 11A, 11B immediately downstream thereof. The continuity of the body 5, 5A, is maintained between the roots of the blades 10A, 11A, by bands 10C, 11C, which almost touch; and that of the pipe 4 by banding 10D, 11D, whilst the tips of the blades 10B, 11B, may (as shown) run in channels in the structure 1, and may carry a shroud ring if desired. By the bands 10C, 11C, and banding 10D, 11D, the air and gases are confined, as by the duct walls.

Figures 3 and 4 show mid-sections of the blades. These figures are representative, and show the direction and order of inclination for a given design case, also the approximate sectional shape. The arrows 18 indicate sense of rotation and the arrows 19, direction of gas or airflow.

The first blades to which the air and gas are incident, viz. 10A and 10B, necessarily impart whirl to the fluids, and it is the intention of the second blades 11A, 11B, to remove that whirl leaving substantially purely axial flow, as well as to effect further energy transformation from gas to air.

The general arrangement of the forward wheel pair 8, 9, may be similar, although the blade shapes, disposition, and proportions, will of course be designed for the duties to be performed.

What I claim is:

1. A propulsion system including a combustion engine as prime mover, first energy transforming means comprising first turbine means and first impeller means driven by said first turbine means, means for leading a first air stream to drive said first turbine means, and means for leading a second air stream to said first impeller means for deriving energy therefrom, means for supplying the said second stream to said combustion engine, second energy transforming means comprising further turbine means and further turbine impeller means driven by the said further turbine means, means for leading the exhaust gases from the combustion engine to drive said further turbine means, means for leading the first air stream through the said further impeller means for deriving energy therefrom, and means for delivering said exhaust gases and said first air stream rearwardly from the system for reaction propulsion.

2. A propulsion system according to claim 1 having means to which said exhaust from the further turbine means and airstream from the further impeller means are delivered and forming a propulsive jet, said system being adapted to produce useful thrust solely by reaction of said jet.

3. A propulsion system comprising a pressure compartment with a forwardly facing air intake, a combustion engine including compressor, combustion and gas-turbine means installed within said compartment, additional compressor means adapted to raise the pressure within said compartment for air supply at elevated pressure to said engine, air turbine means for driving said compressor means mechanically, ducting means for directing an air stream operatively through said air turbine means, further gas-turbine means adapted to be driven by the exhaust gas from said combustion engine, ducting means for conducting the exhaust from said combustion engine to said further gas turbine means, means whereby said further gas-turbine means energises said air stream, and means for leading said air stream and the combustion products of said combustion engine to atmosphere to generate propulsive thrust.

4. A propulsion system comprising a power nacelle including an annular air duct open forwardly and rearwardly, a pressure compartment surrounded thereby which has a second forwardly facing air intake substantially coaxial with said air duct, a combustion engine in said compartment with an exhaust pipe passing rearwardly from said compartment, means whereby energy in the airflow in the air duct is transformed into energy for boosting the compartment pressure, and means whereby energy in the gas flow in the exhaust pipe is transformed into energy in the airflow in the air duct, the outlet of said exhaust pipe cooperating with the outlet of said air duct to merge their respective gas and air streams and to deliver said streams rearwardly from the system as a propulsive jet stream.

5. A system according to claim 4, said two energy transforming means comprising free-running wheels carrying both turbine and compressor blading.

6. A system according to claim 4, each of said energy transforming means comprising a pair of free-running wheels adapted to rotate coaxially in opposite sense, and blading on each wheel to form a compressor and a turbine, said blading being arranged so that the leaving fluid from each energy transforming means is substantially free from whirl velocity.

7. A propulsion system including a combustion engine, duct means for creating a ducted airflow, a first combined turbine and compressor to supercharge said engine in deriving energy from said ducted airflow, a second combined turbine and compressor mechanically independent of the first, means for leading the exhaust of said engine and the said ducted airflow through the said second turbine and compressor elements respectively to energise said airflow in deriving energy from said exhaust, and means for delivering the air and gases leaving the said second turbine and compressor rearwardly from the system as a propulsive stream.

8. A system according to claim 7 comprising a circular-sectioned nacelle, a pressure compartment coaxially within the nacelle, a combustion engine in said compartment having an annular coaxial exhaust pipe, and two pairs of coaxial energy transforming wheels, the nacelle wall and the compartment wall forming an annular air duct in which outer blading of each wheel is operatively situated, the air intake of said compartment being annular with the inner blading of one pair of wheels operatively situated therein, the inner blading of the other pair of wheels being operatively situated in said exhaust pipe.

FRANK WHITTLE.

Certificate of Correction

Patent No. 2,405,919.                                                                August 13, 1946.

FRANK WHITTLE

It is hereby certified that error appears in the printed specification of the above numbered patent requiring correction as follows: Column 1, line 48, strike out "the" and insert instead *turbine*; and that the said Letters Patent should be read with this correction therein that the same may conform to the record of the case in the Patent Office.

Signed and sealed this 29th day of October, A. D. 1946.

[SEAL]

LESLIE FRAZER,
*First Assistant Commissioner of Patents.*